United States Patent
Joshi et al.

(10) Patent No.: US 10,481,033 B2
(45) Date of Patent: Nov. 19, 2019

(54) DIAGNOSING CYLINDER PRESSURE SENSOR GAIN AND OFFSET

(71) Applicant: Cummins, Inc., Columbus, IN (US)

(72) Inventors: Alok A. Joshi, Columbus, IN (US); Richard A. Booth, Columbus, IN (US); Edmund P. Hodzen, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 259 days.

(21) Appl. No.: 14/971,527

(22) Filed: Dec. 16, 2015

(65) Prior Publication Data

US 2017/0176280 A1   Jun. 22, 2017

(51) Int. Cl.

| | |
|---|---|
| *G01L 27/00* | (2006.01) |
| *F02D 41/22* | (2006.01) |
| *G01M 15/08* | (2006.01) |
| *G01L 23/24* | (2006.01) |
| *F02D 35/02* | (2006.01) |
| *F02D 41/04* | (2006.01) |
| *F02D 41/24* | (2006.01) |
| *F02D 41/28* | (2006.01) |

(52) U.S. Cl.
CPC .......... *G01L 27/007* (2013.01); *F02D 35/023* (2013.01); *F02D 41/222* (2013.01); *G01L 23/24* (2013.01); *G01M 15/08* (2013.01); *F02D 41/042* (2013.01); *F02D 41/2474* (2013.01); *F02D 2041/281* (2013.01); *F02D 2200/703* (2013.01); *Y02T 10/40* (2013.01)

(58) Field of Classification Search
CPC .................................................... F02D 35/023
See application file for complete search history.

(56) References Cited

U.S. PATENT DOCUMENTS

| | | |
|---|---|---|
| 5,168,854 A | 12/1992 | Hashimoto et al. |
| 5,469,735 A | 11/1995 | Watanabe |
| 5,554,801 A | 9/1996 | Watanabe |
| 7,726,281 B2 | 6/2010 | Buslepp et al. |
| 7,757,545 B2 | 7/2010 | Sato et al. |
| 8,260,531 B2 | 9/2012 | Yasuda |
| 8,265,853 B2 | 9/2012 | Buslepp et al. |
| 2007/0277591 A1* | 12/2007 | Hoshi ............. F02D 35/023 73/35.05 |
| 2008/0209990 A1* | 9/2008 | Hanari ............. F02D 41/042 73/114.38 |
| 2008/0236264 A1 | 10/2008 | Sato et al. |
| 2010/0299087 A1* | 11/2010 | Menold ............ F02D 41/222 702/47 |
| 2011/0083498 A1 | 4/2011 | Verner et al. |

(Continued)

*Primary Examiner* — Herbert K Roberts
(74) *Attorney, Agent, or Firm* — Foley & Lardner LLP

(57) ABSTRACT

An apparatus includes a sensor module, an offset diagnostic module, and a notification module. The sensor module is in operative communication with a cylinder pressure sensor and structured to acquire cylinder pressure data from the cylinder pressure sensor indicative of an actual in-cylinder pressure of a cylinder of an engine. The offset diagnostic module is structured to interpret the cylinder pressure data to determine an offset of the cylinder pressure sensor based on a reference in-cylinder pressure and the actual in-cylinder pressure. The notification module is structured to provide an offset error notification responsive to the offset being greater than a threshold offset.

17 Claims, 3 Drawing Sheets

(56) References Cited

U.S. PATENT DOCUMENTS

| | | | |
|---|---|---|---|
| 2012/0324989 A1* | 12/2012 | Patel | G01M 15/08 |
| | | | 73/114.16 |
| 2016/0171792 A1* | 6/2016 | Shimose | F02D 41/222 |
| | | | 701/114 |
| 2017/0152813 A1* | 6/2017 | Casetti | B01D 53/0407 |

* cited by examiner

DIAGNOSING CYLINDER PRESSURE SENSOR GAIN AND OFFSET

BACKGROUND

Engine systems typically include cylinder pressure sensors to provide real time metrics of in-cylinder pressure and other characteristics. The metrics frequently measured are often used in closed-loop control strategies to improve the performance of the engine system. However, gain and offset of a cylinder pressure sensor is not assessed prior to applying the feedback control. Gain and offset of a cylinder pressure sensor may significantly affect fuel economy, emissions, and durability of the engine system.

SUMMARY

One embodiment relates to an apparatus. The apparatus includes a sensor module, an offset diagnostic module, and a notification module. The sensor module is in operative communication with a cylinder pressure sensor and structured to acquire cylinder pressure data from the cylinder pressure sensor indicative of an actual in-cylinder pressure of a cylinder of an engine. The offset diagnostic module is structured to interpret the cylinder pressure data to determine an offset of the cylinder pressure sensor based on a reference in-cylinder pressure and the actual in-cylinder pressure. The notification module is structured to provide an offset error notification responsive to the offset of the cylinder pressure sensor being greater than a threshold offset.

Another embodiment relates to a method. The method includes determining a reference in-cylinder pressure for a cylinder of an engine, measuring an actual in-cylinder pressure of the cylinder of the engine with a cylinder pressure sensor while the engine is keyed on and a crankshaft of the engine is not rotating, determining an offset of the cylinder pressure sensor based on the reference in-cylinder pressure and the actual in-cylinder pressure, comparing the offset of the cylinder pressure sensor to a threshold offset, and providing an offset error notification responsive to the offset of the cylinder pressure sensor being greater than the threshold offset.

Another embodiment relates to a system. The system includes an engine, a cylinder pressure sensor communicably coupled to a cylinder of the engine and structured to measure an actual in-cylinder pressure of the cylinder, and a controller communicably coupled to the engine and the cylinder pressure sensor. The controller is structured to determine an offset of the cylinder pressure sensor based on a reference in-cylinder pressure and the actual in-cylinder pressure, compare the offset of the cylinder pressure sensor to a threshold offset, provide an offset error notification responsive to the offset of the cylinder pressure sensor being greater than the threshold offset, and determine a gain of the cylinder pressure sensor responsive to the offset of the cylinder pressure sensor being less than the threshold offset.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for determining the offset and gain of a cylinder pressure sensor. The various concepts introduced above and discussed in greater detail below may be implemented in any number of ways, as the described concepts are not limited to any particular manner of implementation. Examples of specific implementations and applications are provided primarily for illustrative purposes.

Referring to the Figures generally, a system and method is shown for diagnosing an offset and a gain of a cylinder pressure sensor. Cylinder pressure sensors installed on gasoline, diesel, and/or alternate fuel engines are intended to provide a real time metric of in-cylinder pressure to (i) measure peak-cylinder pressure, (ii) detect knock, (iii) reduce peak-cylinder pressure variability to achieve higher average peak-cylinder pressure and improved brake thermal efficiency, (iv) aid for predicting emission concentration in combustion product, and (v) provide feedback in closed-loop control strategies for improving engine performance metrics. Sensor applications over the life of an engine may cause offset and shift in the gain (high or low) of a cylinder pressure sensor due to, for example, aging effects on the sensor performance. Internal sensor failures may be potentially detected by driving sensor output out-of-range high or low. However, aging effects may introduce offset and gain shift in the measurements such that the sensor output is within a specified measurement range. Present techniques do not assess the offset and gain of cylinder pressure sensors before the sensors' measurements are used in feedback control. In-range gain and offset failures of a cylinder pressure sensor may substantially affect fuel economy, emissions, and durability of an engine.

The present disclosure relates to on-board diagnostics for the offset and gain of a cylinder pressure sensor. Cylinder pressure offset may be diagnosed by comparing actual in-cylinder pressure measurements with ambient pressure measurements or estimated pressure measurements while the engine is keyed on but not running. Cylinder pressure gain (i.e., in-range shift, etc.) may be diagnosed by comparing measurements taken in a non-firing condition with reference pressure profiles stored in an electronic control module ("ECM") at various torque-speed conditions or model-based estimates computed dynamically.

Figure 1:
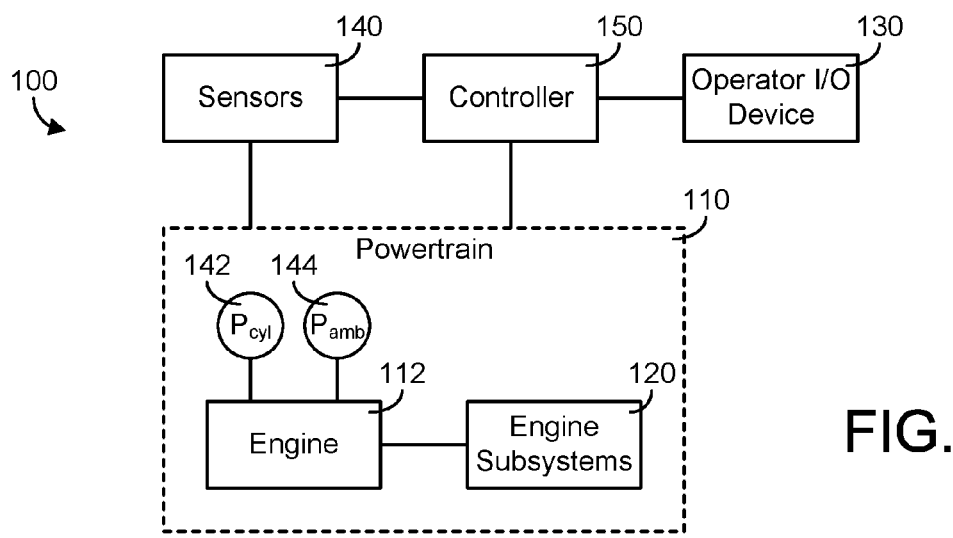
FIG. 1 is a schematic diagram of an engine system with a controller, according to an example embodiment.

Referring now to FIG. 1, a schematic diagram of an engine system 100 with a controller 150 is shown, according to an example embodiment. According to one embodiment, the engine system 100 is embodied within a vehicle. The vehicle may include an on-road or an off-road vehicle including, but not limited to, line-haul trucks, mid-range trucks (e.g., pick-up truck, etc.), sedans, coupes, tanks, airplanes, watercrafts, and any other type of vehicle. In some embodiments, the engine system 100 may be implemented in stationary devices, such as a power generator. All such variations are intended to fall within the spirit and scope of the present disclosure. Further, while FIG. 1 depicts the engine system 100 as including an internal combustion engine 112, the engine system 100 may be powered by another type of power source. For example, the engine system 100 may be a hybrid system or an internal combustion engine powered system as shown. These and other features of the present disclosure are described more fully herein.

As shown in FIG. 1, the engine system 100 generally includes a powertrain system 110, sensors 140 communicably coupled to one or more components of the engine system 100, a controller 150, and an operator input/output ("I/O") device 130. Communication between and among the components of the engine system 100 may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network ("CAN") bus provides the exchange of signals, information, and/or data. The CAN bus includes any number of wired and wireless connections. Because the controller 150 is communicably coupled to the systems and components in the engine system 100 of FIG. 1, the controller 150 may receive data from one or more of the components shown in FIG. 1. For example, the data may include ambient pressure data and/or cylinder pressures data acquired via one or more of the sensors 140. As another example, the data may include engine operating characteristics (e.g., engine speed, power, torque, etc.). As described more fully herein, with this data, the controller 150 determines at least one of an offset and a gain of a cylinder pressure sensor.

As shown in FIG. 1, the powertrain system 110 includes an engine 112. The powertrain system 110 may include any type of components typically included in powertrain systems. For example, the powertrain system 110 may also include, but is not limited to, a transmission, a drive shaft, a differential, and a final drive. As a brief overview, in a vehicle implementation, the engine 112 receives a chemical energy input (e.g., a fuel such as gasoline, diesel, natural gas, propane, etc.) and combusts the fuel to generate mechanical energy in the form of a rotating crankshaft. The transmission receives the rotating crankshaft and manipulates the speed of the crankshaft (i.e., the engine revolutions-per-minute ("RPM"), etc.) to affect a desired drive shaft speed. The rotating drive shaft is received by the differential, which provides the rotational energy of the drive shaft to the final drive. The final drive then propels or moves the vehicle.

The engine 112 may be structured as any internal combustion engine (e.g., compression-ignition, spark-ignition, etc.), such that it may be powered by any fuel type (e.g., diesel, ethanol, gasoline, etc.). Similarly, the transmission may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmissions, etc.), the transmission can include a variety of settings (gears, for a geared transmission) that affect different output speeds based on the engine speed. Like the engine 112 and the transmission, the drive shaft, differential, and final drive may be structured in any configuration dependent on the application (e.g., the final drive may be structured as wheels in an automotive application, a propeller in an airplane application, etc.). The drive shaft may be structured as any type of drive shaft based on the application, including but not limited to, a one-piece, a two-piece, and a slip-in-tube driveshaft.

The engine system 100 is also shown to include engine subsystems 120 coupled to the engine 112. The engine subsystems 120 may include both electrically-powered engine accessories and engine driven accessories, as well any other type of subsystem in the engine system 100. For example, the engine subsystems 120 may include an exhaust aftertreatment system. The exhaust aftertreatment system may include any component used to reduce exhaust emissions (e.g., diesel exhaust emissions, gas exhaust emissions, etc.), such as selective catalytic reduction catalyst, a diesel oxidation catalyst, a diesel particulate filter, a diesel exhaust fluid doser with a supply of diesel exhaust fluid, and a plurality of sensors for monitoring the aftertreatment system (e.g., a NOx sensor, a temperature sensor, etc.). Furthermore, various accessories may include, but are not limited to, air compressors (e.g., for pneumatic devices, etc.), air conditioning systems, power steering pumps, engine coolant pumps, fans, and the like.

Referring still to FIG. 1, the operator I/O device 130 enables an operator of the engine system 100 to communicate with the engine system 100 and the controller 150. For example, the operator I/O device 130 may include, but is not limited to, an interactive display, a touchscreen device, one or more buttons and switches, voice command receivers, etc. In one embodiment, the operator I/O device 130 includes an engine key interface. The engine key interface is configured to provide an operator with the ability to key on (i.e., turn on) or key off (i.e., turn off) the engine 112. The operator of the engine system 100 may also use the operator I/O device 130 to define a threshold offset and a target gain range for the engine system 100, which are each described more fully herein.

Referring still to FIG. 1, the engine system 100 includes one or more sensors 140. The sensors 140 are configured to measure, determine, estimate, and transmit various data regarding the engine 112 and the various components of the engine system 100 to the controller 150. As shown in FIG. 1, the sensors 140 include a first pressure sensor, shown as cylinder pressure sensor 142. The cylinder pressure sensor 142 is communicably coupled to a cylinder of the engine 112 and structured to measure cylinder pressure data indicative an actual in-cylinder pressure of the cylinder. In one embodiment, the engine system 100 includes a plurality of cylinder pressure sensors 142, one for each cylinder of the engine 112. In some embodiments, the sensors 140 include a second pressure sensor, shown as ambient pressure sensor 144. The ambient pressure sensor 144 is structured to measure ambient pressure data indicative of an ambient pressure (e.g., surrounding pressure, external pressure, etc.). The ambient pressure may be used by the controller 150 as a reference in-cylinder pressure for the cylinder pressure sensor 142. The sensors 140 may also include various other sensors structured to acquire engine operation data. By way of example, the sensors 140 may also include an intake manifold temperature sensor and/or an intake manifold pressure sensor structured to measure an intake manifold temperature and/or pressure. By way of another example, the sensors 140 may also include an exhaust temperature sensor and/or an exhaust pressure sensor structured to measure an exhaust temperature and/or pressure. By way of yet another example, the sensors 140 may include an engine speed sensor structured to measure the speed of the engine 112 and/or a vehicle (if in a vehicle embodiment). The sensors 140 may also include a crank angle sensor structured to measure a crank angle of a crankshaft of the engine 112.

In one embodiment, the controller 150 may be embodied as add-on to an electronic control module ("ECM"). In some embodiments, the controller 150 may be a stand-alone tool that performs all required data logging, data tracking, data analysis, etc. needed to diagnose an offset and/or gain of the cylinder pressure sensor 142. In some embodiments, the controller 150 is included in the ECM. The ECM may also include a transmission control unit and any other number of vehicle control units (e.g., exhaust aftertreatment control unit, powertrain control module, engine control module, etc.). The function and structure of the controller 150 is described in greater detail in FIG. 2.

Figure 2:
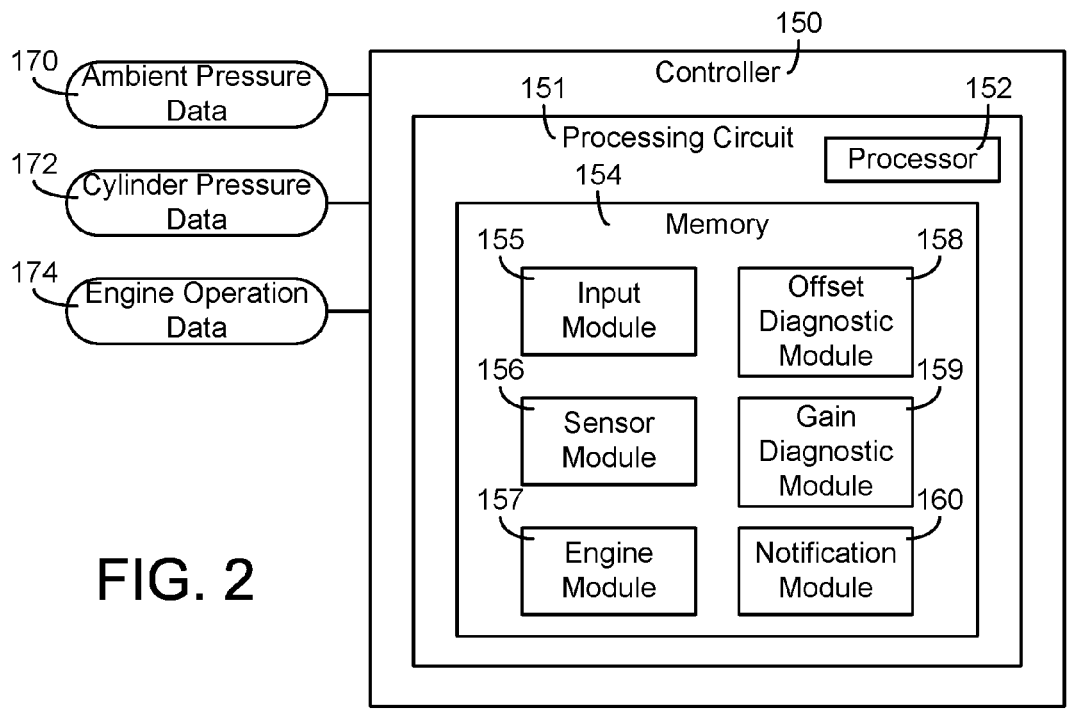
FIG. 2 is a schematic of the controller used with the engine system of FIG. 1, according to an example embodiment.

Referring now to FIG. 2, the function and structure of the controller 150 are shown according to one embodiment. The controller 150 is shown to include a processing circuit 151 including a processor 152 and a memory 154. The processor 152 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 154 (e.g., RAM, ROM, Flash Memory, hard disk storage, etc.) may store data and/or computer code for facilitating the various processes described herein. Thus, the one or more memory devices 154 may be communicably connected to the processor 152 and provide computer code or instructions to the processor 152 for executing the processes described in regard to the controller 150 herein. Moreover, the one or more memory devices 154 may be or include tangible, non-transient volatile memory or non-volatile memory. Accordingly, the one or more memory devices 154 may include database components, object code components, script components, or any other type of information structure for supporting the various activities and information structures described herein.

The memory 154 is shown to include various modules for completing the activities described herein. More particularly, the memory 154 includes modules configured to diagnose an offset and a gain of the cylinder pressure sensor 142. While various modules with particular functionality are shown in FIG. 2, it should be understood that the controller 150 and memory 154 may include any number of modules for completing the functions described herein. For example, the activities of multiple modules may be combined as a single module, additional modules with additional functionality may be included, etc. Further, it should be understood that the controller 150 may further control other activity beyond the scope of the present disclosure.

Certain operations of the controller 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

As shown in FIG. 2, the controller 150 includes an input module 155, a sensor module 156, an engine module 157, an offset diagnostic module 158, a gain diagnostic module 159, and a notification module 160. The input module 155 may be communicably coupled to the operator I/O device 130. The input module 155 is structured to receive one or more inputs from an operator of the engine system 100. For example, the input module 155 may receive an input from an engine key interface indicating whether the engine is keyed on or off. The operator of the engine system 100 may also provide a threshold offset and a target gain range for the cylinder pressure sensor 142 to the input module 155 via the operator I/O device 130. In some embodiments, the threshold offset and the target gain range are predefined within the controller 150 and/or based on the cylinder pressure sensor 142 being used with the engine system 100.

The sensor module 156 is structured to acquire data regarding the operation of the engine system 100. According to an example embodiment, the sensor module 156 is in operative communication with the cylinder pressure sensor 142 and structured to acquire cylinder pressure data 172 from the cylinder pressure sensor 142. The cylinder pressure data 172 may provide an indication of an actual in-cylinder pressure of one or more cylinders of the engine 112. In one embodiment, the sensor module 156 is in operative communication with the ambient pressure sensor 144 and structured to acquire ambient pressure data 170 from the ambient pressure sensor 144. The ambient pressure data 170 may provide an indication of an ambient pressure (e.g., atmospheric pressure, pressure external to the cylinders of the engine 112, etc.). The ambient pressure data 170 may be used to determine a reference in-cylinder pressure for the cylinder of the engine 112. In some embodiments, the sensor module 156 is in operative communication with various other sensors (e.g., temperature sensors, speed sensors, crank angle sensors, pressure sensors, etc.) and structured to acquire engine operation data 174. The engine operation data 174 may provide an indication of at least one of a crank angle, an engine speed, an engine torque, an intake manifold temperature, an intake manifold pressure, a charge mass per cylinder, an exhaust pressure, an exhaust temperature, and the like. The data acquired by the sensor module 156 may be used by various other modules of the controller 150 (e.g., the engine module 157, the offset diagnostic module 158, the gain diagnostic module 159, etc.), as is described more fully herein. In one embodiment, the sensor module 156 is structured to acquire at least one of the ambient pressure data 170, the cylinder pressure data 172, and the engine operation data 174 while the engine 112 is keyed on, but in a non-running condition (i.e., the crankshaft of the engine 112 is not rotating, etc.). In some embodiments, the sensor module 156 is structured to acquire at least one of the ambient pressure data 170, the cylinder pressure data 172, and the engine operation data 174 while the engine 112 is keyed on, the crankshaft of the engine 112 is rotating, but during a non-firing condition (e.g., stopping, motoring, cylinder cut-off/cylinder based braking enabled through variable valve timing, or any other non-firing engine state).

The engine module 157 is communicably coupled to the sensor module 156 and structured to receive at least one of the ambient pressure data 170, the cylinder pressure data 172, and the engine operation data 174 from the sensor module 156. According to an example embodiment, the engine module 157 is structured to determine the reference in-cylinder pressure for the cylinder of the engine 112. The reference in-cylinder pressure represents a pressure that the cylinder pressure sensor 142 should measure when the engine 112 is configured in a non-running condition (i.e., the actual in-cylinder pressure should be equal to the reference in-cylinder pressure when the engine 112 is not running, etc.). The reference in-cylinder pressure may be used to determine an offset (e.g., positive offset, negative offset, etc.) in the pressure measurements of the cylinder pressure sensor 142. In one embodiment, the engine module 157 is structured to determine the reference in-cylinder pressure based on the ambient pressure provided by the ambient pressure data 170 acquired by the ambient pressure sensor 144. In another embodiment, the engine module 157 is structured to determine the reference in-cylinder pressure based on the engine operation data 174, more specifically derived from measurements of intake manifold pressure and temperature. In an alternative embodiment, the engine module 157 is structured to determine the reference in-cylinder pressure based on at least one of an estimate and a measurement of the engine operation data 174. For example, the engine module 157 may be structured to use an algorithm, a look-up table, a function, a model, etc. in combination with various measured data to determine or estimate the reference in-cylinder pressure.

According to another example embodiment, the engine module 157 is structured to determine a reference pressure profile for the cylinder of the engine 112. The pressure profile may be used to determine an in-range gain in the pressure measurements of the cylinder pressure sensor 142. In one embodiment, the engine module 157 is structured to determine the reference pressure profile based on a set of reference profiles stored in the engine module 157 (e.g., at various torque-speed conditions, etc.) and the engine operation data 174. For example, the reference pressure profile may be determined as a combination of pressure profiles as a function of at least one of crank angle, engine speed, and engine torque. In other embodiments, the engine module 157 is structured to determine the reference pressures profile dynamically using a model based approach along with the engine operation data 174.

By way of example, the reference profiles may be obtained by motoring the engine 112 at various target speeds (e.g., separated by 100 rpm, etc.) and covering the entire speed range of the engine 112. The reference pressure profile may be experimentally generated when the engine 1112 is keyed on, the crankshaft of engine 112 is rotating, but during non-firing conditions (e.g. stopping, motoring, cylinder cut-off/cylinder-based braking through variable valve timing or any other non-firing engine state, etc.). The generation of the reference profiles may be repeated using independent instrumentation grade cylinder pressure sensor measurement to ensure that the cylinder pressure sensor 142 to be used in the engine system 100 is healthy at the time of the reference pressure profile generation. Torque in this case is resultant negative torque that is a function of engine friction and engine differential pressure governed by restrictions of a turbocharger (e.g., variable geometry turbocharger effective restriction during motoring, etc.), restrictions by an exhaust throttle, back pressure from the exhaust aftertreatment system, and/or restrictions in an intake (e.g., intake throttle operation during non-firing state of engine, etc.). The reference profile generation may be performed at engine differential pressures controlled by typical settings of restrictive devices such as the intake throttle, the exhaust throttle, the turbocharger, and/or the aftertreatment system.

By way of another example, the reference pressure profile may be constructed by assuming engine speed is piecewise constant over various crank angles (e.g., each 10 degree crank angle step, etc.) when the in-cylinder pressure is acquired during a non-firing event. Experimentally obtained reference pressure may be multiplied by a ratio of estimated motoring torque when the actual in-cylinder pressure was acquired to torque when the reference pressure was acquired to compensate for increase in the temperature of air flow into a power cylinder during motoring as a result of changes in engine differential pressure, if any.

By way of yet another example, the reference pressure profile may be estimated dynamically using a physical model-based approach during an engine non-firing state. During the intake valve closure to exhaust valve opening phase, temperature and pressure of charge trapped in a cylinder may be estimated assuming adiabatic compression or expansion of charge and known state of charge (e.g., pressure, temperature, etc.) at intake valve closure. The gas state during the intake valve closure may be estimated using all or a subset of estimates or measurements such as the intake manifold temperature and pressure, charge mass per cylinder, and exhaust pressure and temperature. The pressure profile may also be determined by averaging cylinder pressure sensor measurements taken during the intake valve closure to exhaust valve opening phase assuming multiple cylinder pressure sensors are available.

The offset diagnostic module 158 is structured to interpret the cylinder pressure data 172 to determine an offset of the cylinder pressure sensor 142 based on the reference in-cylinder pressure determined by the engine module 157 and the actual in-cylinder pressure acquired by the sensor module 156. According to an example embodiment, the offset diagnostic module 158 is structured to determine the offset of the cylinder pressure sensor 142 when the engine 112 is in a non-running condition. In the non-running condition, the engine 112 may be keyed on, but the crankshaft of the engine 112 is not rotating. The offset diagnostic module 158 may determine the offset of the cylinder pressure sensor 142 by comparing the actual in-cylinder pressure measured by the cylinder pressure sensor 142 to the reference in-cylinder pressure determined by the engine module 157 (e.g., based on the ambient pressure data 170, the engine operation data 174, etc.). In one embodiment, the offset diagnostic module 158 determines an absolute value of the offset of the cylinder pressure sensor 142. For example, the cylinder pressure sensor may be miscalibrated, thereby potentially measuring a higher in-cylinder pressure or a lower in-cylinder pressure than the reference in-cylinder pressure. Following the determination of the offset, the offset diagnostic module 158 is structured to compare the offset (e.g., absolute offset, etc.) to a threshold offset. The threshold offset may be defined by an operator of the engine system 100 or predefined within the controller 150. The notification module 160 is structured to provide an offset error notification responsive to the offset being greater than the threshold offset. The notification module 160 may provide the offset error notification via the operator I/O device 130 such as a notification message on a display or an indicator lamp.

The gain diagnostic module 159 is structured determine a gain (e.g., in-range gain, etc.) of the cylinder pressure sensor 142 based on at least one of the actual in-cylinder pressure, the reference in-cylinder pressure, the offset of the cylinder pressure sensor 142, and the reference pressure profile. In one embodiment, the gain diagnostic module 159 determines the gain responsive to the offset of the cylinder pressure sensor 142 being less than the threshold offset. In other embodiments, the gain diagnostic module determines the gain even if the offset of the cylinder pressure sensor 142 is greater than the threshold offset. According to an example embodiment, the gain diagnostic module 159 is structured to determine the gain of the cylinder pressure sensor 142 when the engine 112 is in a non-firing condition. In the non-firing condition, the engine 112 may be keyed on, the crankshaft of the engine 112 may be rotating, but the engine 112 is not firing.

According to an example embodiment, the gain diagnostic module 159 determines the gain of the cylinder pressure sensor 142 by determining the ratio between the difference of the actual in-cylinder pressure and offset of the cylinder pressure sensor 142, and the reference pressure profile. In some embodiments, the gain diagnostic module 159 calculates an average ratio over the intake valve closure to exhaust valve opening phase to determine the gain shift. After determining the gain, the gain diagnostic module 159 is structured to compare the gain to a target gain range. The target gain range may be defined by an operator of the engine system 100 or predefined within the controller 150. In one embodiment, the target gain range is chosen based on the robustness of the feedback control system by using the cylinder pressure sensor signal for a specific task. The notification module 160 is structured to provide a gain error notification responsive to the gain being outside of the target gain range. The notification module 160 may provide the gain error notification via the operator I/O device 130 such as a notification message on a display or an indicator lamp.

Figure 3:
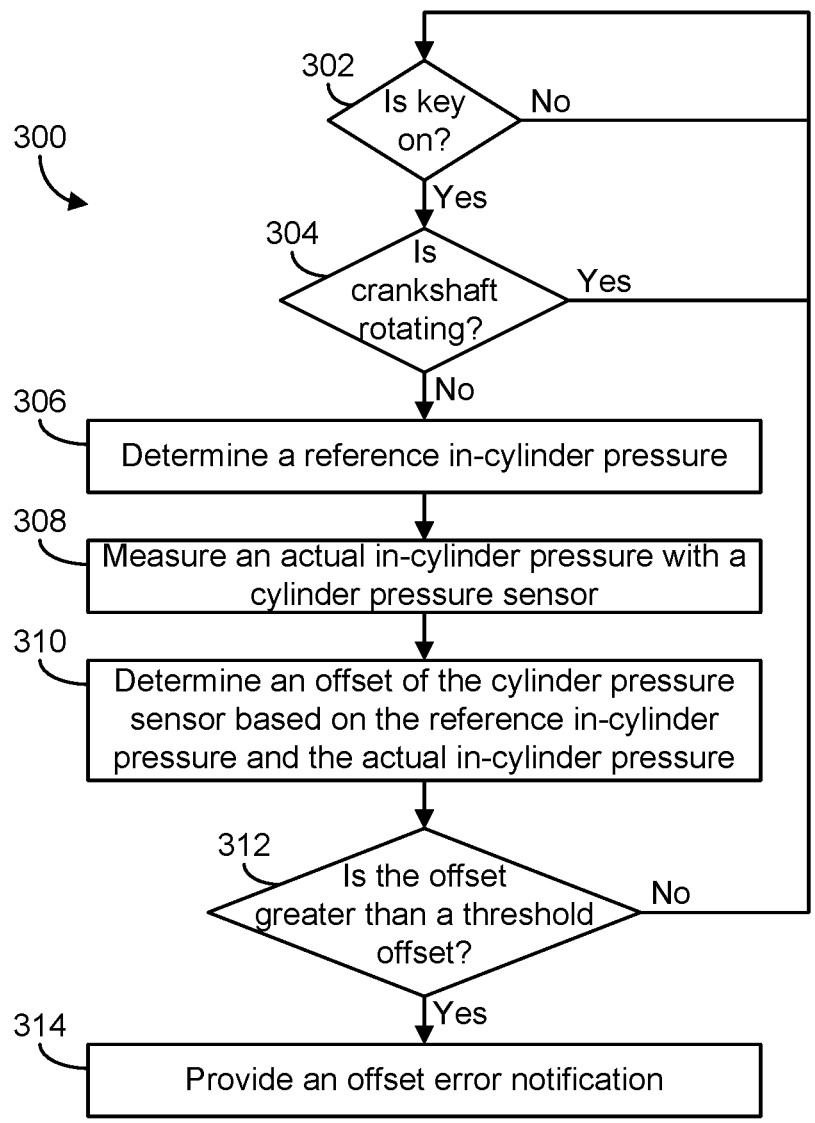
FIG. 3 is a flow diagram of a method for determining an offset of a cylinder pressure sensor, according to an example embodiment.

Referring now to FIG. 3, a method 300 for determining an offset of a cylinder pressure sensor is shown according to an example embodiment. In one example embodiment, method 300 may be implemented with the controller 150 of FIGS. 1-2. Accordingly, method 300 may be described in regard to FIGS. 1-2.

At process 302, the controller 150 is structured to determine whether an engine (e.g., the engine 112, etc.) is keyed on. When the engine is indicated as being keyed on, the controller 150 is structured to determine whether a crankshaft of the engine is rotating (process 304). If the crankshaft is rotating, the method 300 restarts. If the crankshaft is not rotating, at process 306 the controller determines a reference in-cylinder pressure. In one embodiment, the controller 150 determines the reference in-cylinder pressure based on ambient pressure data (e.g., the ambient pressure data 170, etc.) acquired via an ambient pressure sensor (e.g., the ambient pressure sensor 144, etc.). In another embodiment, the controller 150 determines the reference in-cylinder pressure based on at least one of an estimate and a measurement of engine operation data (e.g., the engine operation data 174, etc.). At process 308, the controller 150 receives cylinder pressure data (e.g., the cylinder pressure data 172, etc.) measured by a cylinder pressure sensor (e.g., the cylinder pressure sensor 142, etc.) providing an indication of an actual in-cylinder pressure.

At process 310, the controller 150 is structured to determine an offset (e.g., an absolute offset, etc.) of the cylinder pressure sensor based on a difference between the reference in-cylinder pressure and the actual in-cylinder pressure. At process 312, the controller 150 is structured to determine whether the offset of the cylinder pressure sensor is greater than a threshold offset. At process 314, the controller 150 is structured to provide an offset error notification responsive to the offset being greater than the threshold offset. In one embodiment, the controller 150 is structured to determine a gain of the cylinder pressure sensor responsive to the offset of the cylinder pressure sensor being less than the threshold offset.

Figure 4:
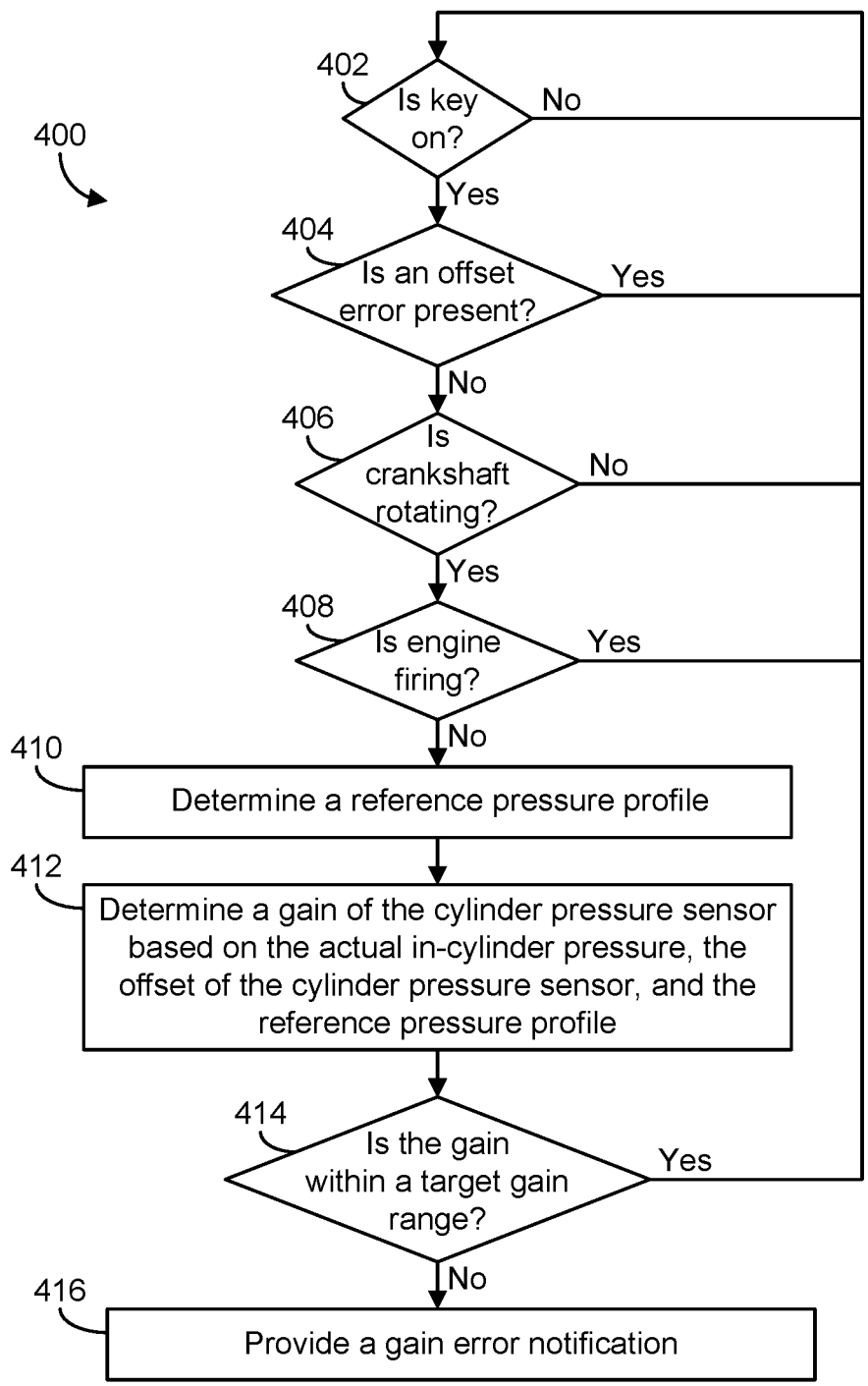
FIG. 4 is a flow diagram of a method for determining a gain of a cylinder pressure sensor, according to an example embodiment.

Referring now to FIG. 4, a method 400 for determining a gain of a cylinder pressure sensor is shown according to an example embodiment. In one example embodiment, method 400 may be implemented with the controller 150 of FIGS. 1-2. Accordingly, method 400 may be described in regard to FIGS. 1-2.

At process 402, the controller 150 is structured to determine whether the engine is keyed on. When the engine is indicated as being keyed on, at process 404, the controller 150 is structured to determine whether an offset error is present (e.g., the method 300, etc.). If an offset error is not present, the controller 150 is structured to determine whether the crankshaft of the engine is rotating (process 406). In some embodiments, the controller 150 may proceed with method 400 even is an offset error is present. If the crankshaft is not rotating, the method 400 restarts. If the crankshaft is rotating, at process 408, the controller 150 is structured to determine whether the engine is in a non-firing condition. If the engine is firing, the method 400 restarts.

At process 410, the controller 150 is structured to determine a reference pressure profile. In one embodiment, the reference pressure profile is based on at least one of an estimate and a measurement of engine operation data. At process 412, the controller 150 is structured to determine a gain of the cylinder pressure sensor. The gain may be based on at least one of the actual in-cylinder pressure, the reference in-cylinder pressure, the offset of the cylinder pressure sensor, and the reference pressure profile. At process 414, the controller 150 is structured to determine whether the gain of the cylinder pressure sensor is within a target gain range. At process 416, the controller 150 is structured to provide a gain error notification responsive to the gain being outside of the target gain range.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Example and non-limiting module implementation elements include sensors (e.g., sensors 140) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory ("RAM"), a read-only memory ("ROM"), an erasable programmable read-only memory (EPROM or Flash memory), a portable compact disc read-only memory ("CD-ROM"), a digital versatile disc ("DVD"), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency ("RF"), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network ("WAN"), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:
1. An apparatus, comprising:
  a sensor module in operative communication with a cylinder pressure sensor and structured to acquire cylinder pressure data from the cylinder pressure sensor indicative of an actual in-cylinder pressure of a cylinder of an engine while the engine is keyed on and the crankshaft of the engine is not rotating;
an offset diagnostic module structured to interpret the cylinder pressure data to determine an offset of the cylinder pressure sensor based on a reference in-cylinder pressure and the actual in-cylinder pressure, wherein the reference in-cylinder pressure is based on an ambient pressure measured at a location external to the engine and an air intake system, wherein the offset of the cylinder pressure sensor is determined while the engine is keyed on and a crankshaft of the engine is not rotating;
a gain diagnostic module structured to determine a gain of the cylinder pressure sensor while the engine is keyed on, the crankshaft of the engine is rotating, and the engine is not firing; and
a notification module structured to provide an offset error notification responsive to the offset of the cylinder pressure sensor being greater than a threshold offset.

2. The apparatus of claim 1, wherein the gain diagnostic module is structured to:
determine the gain of the cylinder pressure sensor responsive to the offset of the cylinder pressure sensor being less than the threshold offset and based on at least one of the actual in-cylinder pressure, the reference in-cylinder pressure, the offset of the cylinder pressure sensor, and a reference pressure profile; and
compare the gain of the cylinder pressure sensor to a target gain range.

3. The apparatus of claim 2, wherein the notification module is structured to provide a gain error notification responsive to the gain of the cylinder pressure sensor being outside of the target gain range.

4. The apparatus of claim 1, wherein the sensor module is structured to acquire engine operation data indicative of at least one of a crank angle, an engine speed, an engine torque, an intake manifold temperature, an intake manifold pressure, a charge mass per cylinder, an exhaust pressure, and an exhaust temperature.

5. The apparatus of claim 4, further comprising an engine module structured to determine at least one of the reference in-cylinder pressure and the reference pressure profile based on the engine operation data.

6. The apparatus of claim 1, wherein the sensor module is in operative communication with an ambient pressure sensor and structured to interpret ambient pressure data from the ambient pressure sensor indicative of the ambient pressure.

7. A method, comprising:
determining a reference in-cylinder pressure for a cylinder of an engine based on an ambient pressure measured at a location external to the engine and an air intake system;
measuring an actual in-cylinder pressure of the cylinder of the engine with a cylinder pressure sensor while the engine is keyed on and a crankshaft of the engine is not rotating;
determining an offset of the cylinder pressure sensor based on the reference in-cylinder pressure and the actual in-cylinder pressure;
comparing the offset of the cylinder pressure sensor to a threshold offset;
providing an offset error notification responsive to the offset of the cylinder pressure sensor being greater than the threshold offset; and
determining a gain of the cylinder pressure sensor while the engine is keyed on, the crankshaft of the engine is rotating, and the engine is not firing.

8. The method of claim 7, wherein the gain of the cylinder pressure sensor is determined responsive to the offset of the cylinder pressure sensor being less than the threshold offset.

9. The method of claim 7, wherein the gain of the cylinder pressure sensor is based on at least one of the actual in-cylinder pressure, the reference in-cylinder pressure, the offset of the cylinder pressure sensor, and a reference pressure profile.

10. The method of claim 9, further comprising determining at least one of the reference in-cylinder pressure and the reference pressure profile based on at least one of an estimate and a measurement of engine operation data, wherein the engine operation data provides an indication of at least one of a crank angle, an engine speed, an engine torque, an intake manifold temperature, an intake manifold pressure, a charge mass per cylinder, an exhaust pressure, and an exhaust temperature.

11. The method of claim 7, further comprising:
comparing the gain of the cylinder pressure sensor to a target gain range; and
providing a gain error notification responsive to the gain of the cylinder pressure sensor being outside of the target gain range.

12. The method of claim 7, further comprising measuring the ambient pressure with an ambient pressure sensor.

13. A system, comprising:
a cylinder pressure sensor configured to be communicably coupled to a cylinder of an engine and structured to measure an actual in-cylinder pressure of the cylinder while the engine is keyed on and the crankshaft of the engine is not rotating; and
a controller configured to be communicably coupled to the engine and the cylinder pressure sensor, the controller structured to:
determine an offset of the cylinder pressure sensor based on a reference in-cylinder pressure and the actual in-cylinder pressure, wherein the reference in-cylinder pressure is based on an ambient pressure measured at a location external to the engine and an air intake system, and wherein the offset of the cylinder pressure sensor is determined while the engine is keyed on and a crankshaft of the engine is not rotating;
compare the offset of the cylinder pressure sensor to a threshold offset;
provide an offset error notification responsive to the offset of the cylinder pressure sensor being greater than the threshold offset; and
determine a gain of the cylinder pressure sensor responsive to the offset of the cylinder pressure sensor being less than the threshold offset, wherein the gain is determined while the engine is keyed on, the crankshaft of the engine is rotating, and the engine is not firing.

14. The system of claim 13, wherein the gain of the cylinder pressure sensor is based on at least one of the actual in-cylinder pressure, the reference in-cylinder pressure, the offset of the cylinder pressure sensor, and a reference pressure profile.

15. The system of claim 14, wherein at least one of the reference in-cylinder pressure and the reference pressure profile is based on at least one of an estimate and a measurement of engine operation data, wherein the engine operation data includes at least one of a crank angle, an engine speed, an engine torque, an intake manifold temperature, an intake manifold pressure, a charge mass per cylinder, an exhaust pressure, and an exhaust temperature.

16. The system of claim 13, wherein the controller is structured to compare the gain of the cylinder pressure sensor to a target gain range, wherein the controller is structured to provide a gain error notification responsive to the gain of the cylinder pressure sensor being outside of the target gain range.

17. The system of claim 13, further comprising an ambient pressure sensor structured to measure the ambient pressure.

* * * * *